US008429150B2

United States Patent
Chappell et al.

(10) Patent No.: US 8,429,150 B2
(45) Date of Patent: Apr. 23, 2013

(54) DISTRIBUTED QUERY COMPILATION AND EVALUATION SYSTEM AND METHOD

(75) Inventors: Geoffrey Chappell, Belfast, ME (US); Derrish Repchick, Putney, VT (US)

(73) Assignee: Intellidimension, Inc., Brattleboro, VT (US)

( * ) Notice: Subject to any disclaimer, the term of this patent is extended or adjusted under 35 U.S.C. 154(b) by 0 days.

(21) Appl. No.: 13/047,415

(22) Filed: Mar. 14, 2011

(65) Prior Publication Data

US 2012/0066206 A1 Mar. 15, 2012

Related U.S. Application Data

(60) Provisional application No. 61/313,794, filed on Mar. 14, 2010.

(51) Int. Cl.
*G06F 17/30* (2006.01)
(52) U.S. Cl.
USPC .......................................... 707/713; 707/769
(58) Field of Classification Search .................. 707/711, 707/713, 769
See application file for complete search history.

(56) References Cited

U.S. PATENT DOCUMENTS

| | | | |
|---|---|---|---|
| 5,666,525 A * | 9/1997 | Ross | 1/1 |
| 6,345,267 B1 * | 2/2002 | Lohman et al. | 1/1 |
| 7,725,470 B2 * | 5/2010 | Richards et al. | 707/737 |
| 2005/0154901 A1 * | 7/2005 | Shaw et al. | 713/189 |
| 2007/0156769 A1 * | 7/2007 | Sinclair | 707/200 |
| 2009/0119247 A1 * | 5/2009 | Bellamkonda et al. | 707/2 |
| 2011/0047144 A1 * | 2/2011 | Han et al. | 707/718 |
| 2011/0082855 A1 * | 4/2011 | Al-Omari et al. | 707/715 |

* cited by examiner

*Primary Examiner* — John E Breene
*Assistant Examiner* — Andalib Lodhi
(74) *Attorney, Agent, or Firm* — Downs Rachlin Martin PLLC

(57) ABSTRACT

A system and method for distributed query compilation and evaluation involving a first table having a first number of partitions and a second table having a second number of partitions. A query operation, such as a join, is performed for each combination of partitions from the first and second tables. The result of each query operation on each combination of partitions is organized into a third number of partitions. A number of tables equal to the third number are generated with each table including one of the partition results from each of the query operation combinations.

10 Claims, 8 Drawing Sheets

DISTRIBUTED QUERY COMPILATION AND EVALUATION SYSTEM AND METHOD

RELATED APPLICATION DATA

This application claims the benefit of priority of U.S. Provisional Patent Application Ser. No. 61/313,794 filed Mar. 14, 2010, and titled "Distributed Query Compilation and Evaluation System and Method," which is incorporated by reference herein in its entirety.

FIELD OF THE INVENTION

The present invention generally relates to the field of data management query compilation and evaluation. In particular, the present invention is directed to a distributed query compilation and evaluation system and method.

SUMMARY OF THE DISCLOSURE

In one exemplary implementation, a method of evaluating a query is provided. The method includes obtaining a first number of partitions of a first table; obtaining a second number of partitions of a second table; performing a query operation for each combination of the first number of partitions and the second number of partitions; generating a third number of partitions for the result of each combination; and reducing corresponding partitions across combination results to a number of intermediate tables corresponding to the third number.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION

Figure 1:
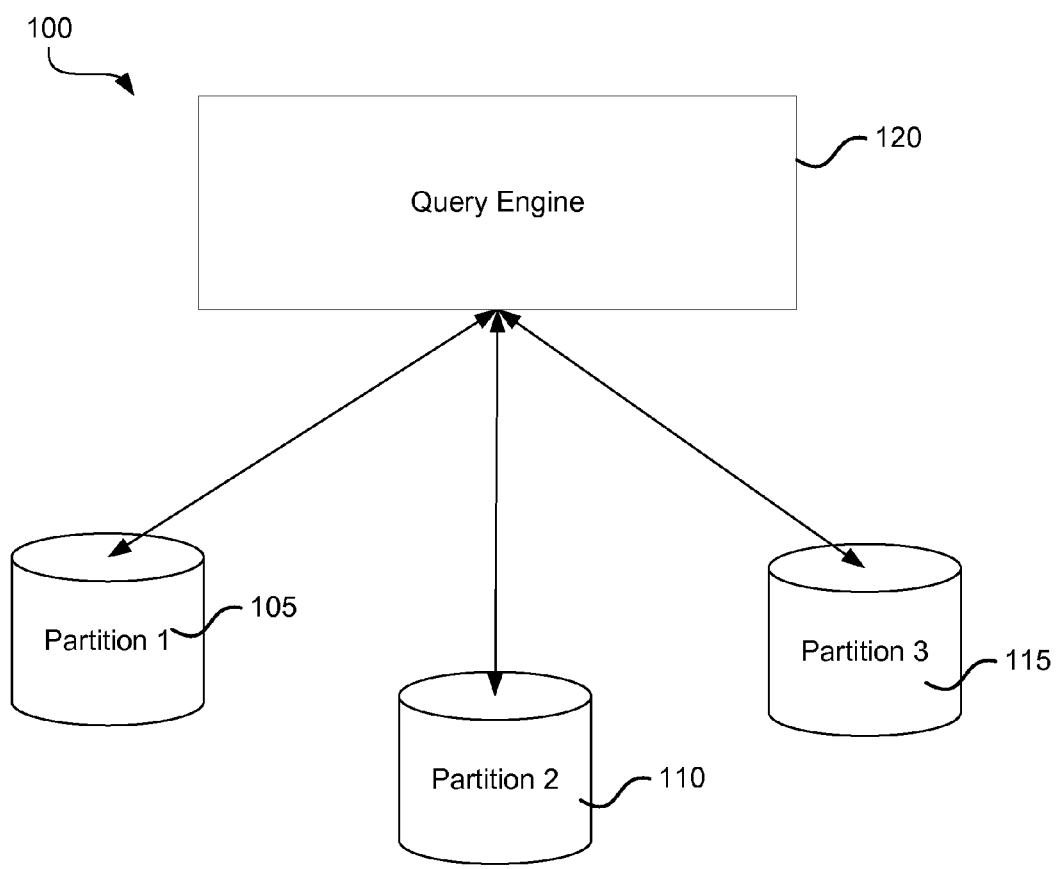
FIG. 1 illustrates an exemplary implementation of a data query system.

A distributed query compilation and evaluation system and method are provided. FIG. 1 illustrates an exemplary implementation of a data query system 100 in which data is stored in three partitions 105, 110, and 115. Data records having the same value for a partition organization parameter are stored in one of partitions 105, 110, and 115. Although three partitions are shown in this example, any number of partitions can be utilized. It is possible that each of partitions 105, 110, and 115 may include two or more sets of data records, each set having the same value for a partition organization parameter. System 100 includes a query engine 120 configured to receive a query, track which data is in each of partitions 105, 110, 115; compile the query for evaluation against the data in partitions 105, 110, 115; and apply the compiled query to the data. In one example, query engine 120 may include processing and other hardware configured with executable instructions for performing its tasks. An exemplary machine for executing one or more of the aspects of system 100 is discussed further below with respect to FIG. 8. Any one or more of the aspects of system 100 may be associated with one or more computing resources. In one example, query engine 120 and partitions 105, 110, 115 are associated with one computing device, such as a database server. In another example, partition 105, partition 110, partition 115, and one or more of the aspects of query engine 120 are distributed across two or more computing devices (e.g., computers connected via one or more networks). An example of a distributed data management system is described below with respect to FIG. 7. A data graph may be distributed physically and/or virtually over any number of computing resources and associated memory elements.

In one embodiment of a method of evaluating a query against a partitioned data graph, the results of each partition combination of tables and/or graphs of an operation of the query are partitioned. The corresponding partitions across the result combinations are reduced to an intermediate table. Aspects of such an embodiment are discussed further below.

One way to organize data is in a Resource Description Framework. Resource Description Framework, commonly referred to as RDF, is a family of World Wide Web Consortium specifications. RDF utilizes resource description framework statements to represent resources in a data model. Examples of resources that can be represented in an RDF data model include, but are not limited to, resources from the World Wide Web, resources from one or more databases, and any combinations thereof. An RDF statement typically includes a subject, a predicate, and an object. A subject identifies a particular resource. An object identifies something about a subject. A predicate identifies a relationship between the subject and the object. An RDF statement may include additional information other than a subject, predicate, and object. Typically, an RDF statement is referred to as a "triple." It is possible that an additional data element, such as the context and/or source of the RDF statement, also be included for each RDF statement. In one such example, an RDF statement may be referred to as a "quad" or "quadruple." Other variations of an RDF statement are contemplated.

Data values for the subject, predicate, and object of an RDF statement may take a variety of general forms. Examples of such forms include, but are not limited to, a Uniform Resource Identifier ("URI"), a literal data value, a blank value, and any combinations thereof. In one example, the subject, predicate, and object of an RDF statement each utilize the same form of data value. In another example, each of the subject, predicate, and object of an RDF statement utilize any one of the example data forms discussed above. The subject of an RDF statement is typically in the form of a Uniform Resource Identifier ("URI"). Other forms are also possible, such as a blank node or a literal. A URI can represent any resource. In one aspect, a URI may be represented as an addressable location of a resource on a network. Examples of networks for which a URI may represent a resource include, but are not limited to, the Internet (e.g., the World Wide Web), a local area network, a wide area network, a directly connected database, and any combinations thereof. In one such example, a URI may take the form of an identifier beginning with the "http:" prefix. A URI may also utilize the "http:" prefix (or similar variant, such as "shttp:") where the URI does not actually represent a location of a network accessible resource. The predicate and/or object of an RDF statement may also be represented as a URI. Literal data statements may also be used for one or more of a subject, predicate, and object of an RDF statement. In one example, an object of an RDF statement is a literal data statement.

An RDF statement and its data values may be encoded in any of a variety of serialization or file formats. Examples of serialization formats for an RDF statement include, but are not limited to, an XML format, a Notation 3 ("N3") format, a Turtle format, an N-Triples format, and any combinations thereof. A serialization format may utilize a known set of URI's to identify aspects of a subject, predicate, and/or object. In another example, a serialization format may utilize a proprietary notation format.

An original RDF statement that represents a resource itself may have additional RDF statements that refer back to the original RDF statement as being its own resource. In one such example, the original RDF statement may be assigned a URI to which other RDF statements may refer. Examples of additional RDF statements that may be made referring to an original RDF statement include, but are not limited to, an RDF statement referring to the original RDF statement's subject as a resource, an RDF statement referring to the original RDF statement's predicate as a resource, an RDF statement referring to the original RDF statement's object as a resource, and any combinations thereof.

Table 1 illustrates an example set of RDF statements. The first seven RDF statements in the table include URI data value's for the subject and predicate and a literal data value for the object. The remaining RDF statements in the table include URI data values for each of the subject, predicate, and object.

In this limited example set of RDF statements, as shown in Table 1, two RDF statements have a subject value of <http://uspres.x/gwashington>, five RDF statements have a subject value of <http://presinfo.x/geowash>, and the remaining RDF statements have different subject values. Referring again to FIG. 1, in one example partitioning of these RDF statements, statements having a subject value of <http://uspres.x/gwashington> are located in partition 105 along with statements having subject values <http://history-usa.x/george_washington> and <http://usnews.x/article/2009/09/01>; statements having a subject value of <http://presinfo.x/geowash> are located in partition 110; and statements having a subject values of <http://encyclopedia.x/vol1/uspresidents>, <http://whitehouse.x/presidents>, <http://johndoe.x/blog/2009/06/15>, <http://uscurrency.x/onedollarbill/>, and <http://usrevolution.x/> are located in partition 115.

It is possible to assign a handle value to a data values. It should be noted that handle values do not need to be assigned to all data values in a group of RDF statements. A handle value is a value that replaces the original data value with another statement that is usually smaller in data size. Using handle values to store RDF statements can minimize the computing resources required to manage the RDF statements and/or increase the speed of retrieval of information from the RDF statements. This may be particularly significant decrease in resources required when the number of RDF statements is very large and/or the repetition of particular data values across the RDF statement is large.

A relationship between each data value and the assigned handle value can be maintained in a library. Example ways to maintain the relationship between the data value and the handle value include, but are not limited to, a cross-over table, other relationship monitoring format in a memory, and any combinations thereof.

Table 2 illustrates an example assignment of handle values for data values of the RDF statements in Table 1. In this example, numerical handle values 1 to 17 are assigned to the data values. Here, the data values from the subjects, predicates, and objects of the RDF statements in Table 1 are assigned handle values. In this example, some of the data values are not assigned handles. In other examples, all of the data values can be assigned handles.

TABLE 1

Example RDF Statements
RDF Statements (Input Data)

| Subject (s) | Predicate (P) | Object (O) |
| --- | --- | --- |
| <http://uspres.x/gwashington> | <http://ontology.z/FirstName> | "George" |
| <http://uspres.x/gwashington> | <http://ontology.z/LastName> | "Washington" |
| <http://presinfo.x/geowash> | <http://ontology.z/FirstName> | "George" |
| <http://presinfo.x/geowash> | <http://ontology.z/LastName> | "Washington" |
| <http://presinfo.x/geowash> | <http://ontology.z/BirthState> | "Virginia" |
| <http://presinfo.x/geowash> | <http://ontology.z/VicePresident> | "John Adams" |
| <http://history-usa.x/george_washington> | <http://ontology.z/Name> | "George Washington" |
| <http://usnews.x/article/2009/09/01> | <http://ontology.a/President> | <http://uspres.x/gwashington> |
| <http://encyclopedia.x/vol1/uspresidents> | <http://ontology.b/FirstPresident> | <http://uspres.x/gwashington> |
| <http://whitehouse.x/presidents> | <http://ontology.c/USPresident> | <http://uspres.x/gwashington> |
| <http://johndoe.x/blog/2009/06/15> | <http://ontology.d/Person> | <http://presinfo.x/geowash> |
| <http://uscurrency.x/onedollarbill/> | <http://ontology.e/PortraitOf> | <http://presinfo.x/geowash> |
| <http://usrevolution.x/> | <http://ontology.f/General> | <http://history-usa.x/george_washington> |

TABLE 2

Example Handle Assignment
Handle Table

| Handle ID | Value |
| --- | --- |
| 1 | <http://uspres.x/gwashington> |
| 2 | <http://presinfo.x/geowash> |
| 3 | <http://history-usa.x/george_washington> |
| 4 | <http://encyclopedia.x/vol1/uspresidents> |

TABLE 2-continued

Example Handle Assignment
Handle Table

| Handle ID | Value |
|---|---|
| 5 | <http://johndoe.x/blog/2009/06/15> |
| 6 | <http://uscurrency.x/onedollarbill/> |
| 7 | <http://usnews.x/article/2009/09/01> |
| 8 | <http://usrevolution.x/> |
| 9 | <http://whitehouse.x/presidents> |
| 10 | <http://ontology.z/Name> |
| 11 | "George Washington" |
| 12 | <http://ontology.a/President> |
| 13 | <http://ontology.b/FirstPresident> |
| 14 | <http://ontology.c/USPresident> |
| 15 | <http://ontology.d/Person> |
| 16 | <http://ontology.e/PortraitOf> |
| 17 | <http://ontology.f/General> |

Figure 2:
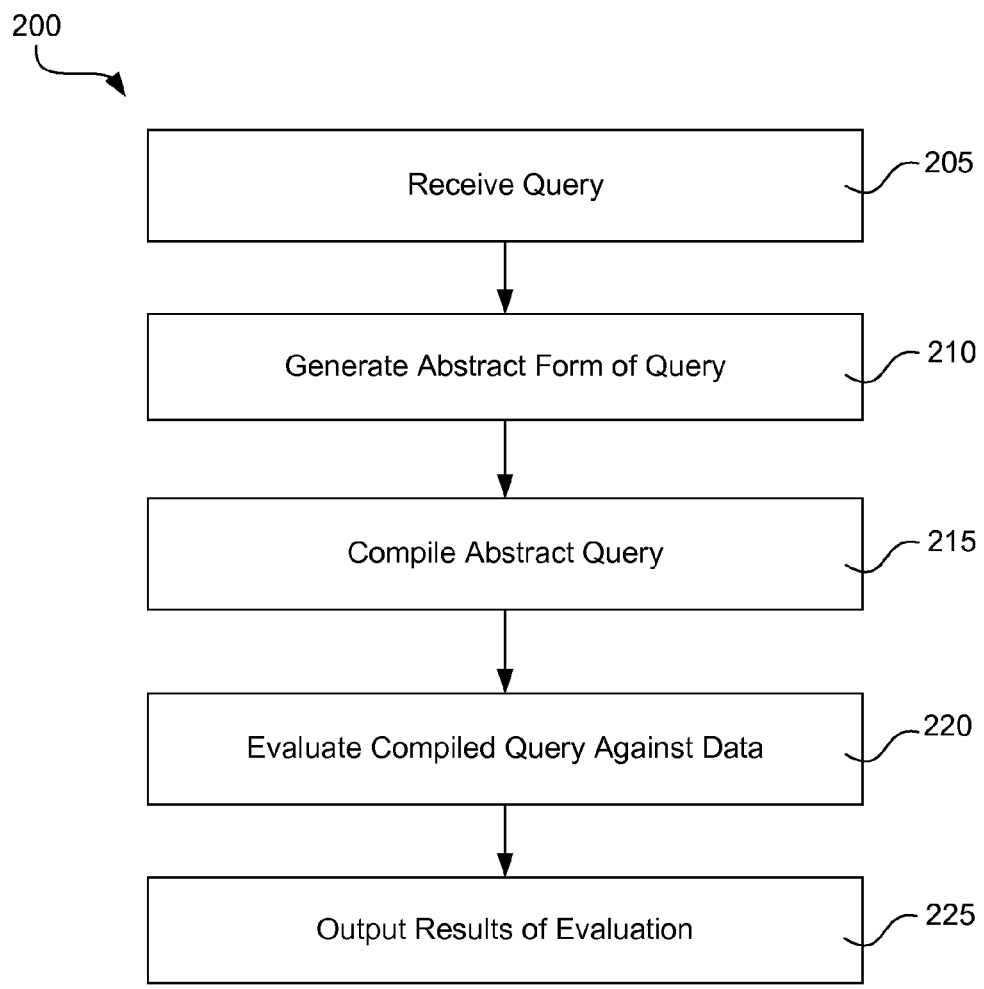
FIG. 2 illustrates an exemplary implementation of a query compilation and evaluation method.

FIG. 2 illustrates one exemplary implementation of a query compilation and evaluation method 200. At step 205, a query is received. Queries to a set of data can come in a variety of formats. Example formats include, but are not limited to, SPARQL, DQL, N3QL, R-Device, RDFQ, RDQ, RDQL, RQL/RVL, SeRQL, Versa, XUL, Adenine, SQL ("Structured Query Language"), OQL ("Object Query Language"), CQL ("Common Query Language"), YQL ("Yahoo! Query Language"), DMX ("Data Mining Extensions"), and any combinations thereof. In one example of an RDF data system, a SPARQL query can be utilized.

At step 210, an abstract form of the query is generated. In another example, a query may be provided (e.g., provided to a query engine and/or query server) in an abstract form and received at step 205 without a need to generate the abstract form at step 210. Examples of abstract forms of a query include, but are not limited to, sum of products ("SOP") form. In one example, an SOP form represents a logical expression in which a logical "OR" operator is applied to two or more subexpressions, each of which is an application of a logical AND operator.

Step 210 may also include ordering the constraints of the query (e.g., the query in abstract form) for efficient application to the specific organization of the data and the data itself. In one example, the ordering may be done based on statistics of the database. A variety of ways to order constraints of a query for efficient application to specific data will be clear to those of ordinary skill in light of this disclosure. One such example of ordering utilizes cost-based ordering.

For illustrative purposes, an example SPARQL query in an RDF environment will be considered. In this example, the RDF data is partitioned based on the subject of the RDF statements. An example query of finding all companies that have an employee named John Doe can be written as follows:

```
select ?c where {
    ?c rdf:type x:Company.
    ?c x:employee ?e.
        ?e x:firstName "John".
        ?e x:lastName "Doe".
}
```

This example query is shown in a representative SPARQL notation. It should be noted that RDF systems and associated queries can utilize any of a variety of notations. This notation is used as an example.

An abstract representation of this exemplary query can be written in SOP form as:

```
answer(?c):
    statement(?c rdf:type x:Company),
    statement(?c x:employee ?e),
    statement(?e x:firstName "John"),
    statement(?e x:lastName "Doe")
```

This example abstract representation of the query includes four constraints: statement(?c rdf:type x:Company), statement(?c x:employee ?e), statement(?e x:firstName "John"), and statement(?e x:lastName "Doe"). The first two constraints include the unbound variable "?c", representing a subject value. The third and fourth constraints include the variable "?e", representing a subject value.

At step 215, the query is compiled for execution against the desired data. This compiling may include converting the constraints to executable functions and operations in a form compatible with the data format being used. Those of ordinary skill will recognize a variety of ways to formulate the executable functions and operations for a given data set, query notation, and data format. Example aspects to consider in compiling a query include, but are not limited to, ordering operations, maximizing ability to run operations in parallel, consideration of the statistics of the data in the target data graph, and any combinations thereof. The compilation may include ordering operations of the query into an order that will be compatible with the data graph and other data used to resolve the query. For example, the operations may be ordered to have operations that will produce intermediate tables needed in a later operation perform before the later operations. By looking at the data that will be required in later operations, it may be possible to reduce the number of joins in the query. In another example, a query can be compiled with a consideration for maximizing the ability for operations to run in parallel (e.g., via layers, via partitioning scheme design, etc.). Additionally, statistics of the data may be utilized to structure and organize operations for efficient evaluation of the data. Example query compilers are commercially available. One example of a commercially available query compiler is Semantics.Server available from Intellidimension, Inc. of Brattleboro, Vt. In another example, compilation of a query may include clumping of query constraints as set forth in commonly owned copending application entitled "Query Compilation Optimization System and Method," filed on Mar. 14, 2010, having Ser. No. 61/313,791, the disclosure of which is incorporated herein by reference in its entirety.

Another example SPARQLE query in an RDF environment (partitioned on subject) is presented as:

```
prefix ex: <http://www.example.org/>
prefix rdf: <http://www.w3.org/2000/01/rdf-schema#>
select ?s ?e ?f ?l where {
    ?s rdf:type ex:Company;
        ex:employee ?e.
    ?e rdf:type ex:Person
        ex:firstname ?f;
        ex:lastname ?l.
}
```

This query uses another exemplary notation and presents the request of finding all values of ?s, ?e, ?f, and ?l such that ?e has a first name of ?f and a last name of ?l, ?e is a person and ?e is an employee of ?s, and ?s is a company. The notation "http://www.example.org/" refers to a namespace containing properties and classes for the data set. The "prefix" notation allows shorthand insertion of the notation "http://www.example.org/" as the shorthand "ex:" and "http://www.w3.org/2000/01/rdf-schema#" as "rdf:".

This query can be rewritten into an abstract form. As part of the rewriting process and/or the compiling process, the constraints of an abstract query may be ordered (e.g., for least cost evaluation). The example query can be written in an SOP abstract form as follows:

```
pred_0_258006(?s ?e ?f ?l)
    statement(?e <http://www.example.org/lastname> ?l)
    statement(?e <http://www.example.org/firstname> ?f)
    statement(?s <http://www.w3.org/2000/01/rdf-schema#type>
        <http:///www.example.org/Company>)
    statement(?e <http://www.w3.org/2000/01/rdf-schema#type>
        <http:///www.example.org/Person>)
    statement(?s <http://www.example.org/employee> ?e)
```

The five statement constraints can be compiled into operations that are executable against the RDF data to give the values of ?s, ?e, ?f, and ?l that meet the constraints. The resulting answer is written to a table "pred_0_258006." An example compiled listing of operations for this abstract form includes:

| Order | Operation | Output Intermediate Table | Input 1 | Input 2 | Layer |
|---|---|---|---|---|---|
| 0 | Copy | 0: T1 | 0: statement_fbf | | 0 |
| 1 | Join | 1: T2 | 0: T1 | 5: statement_bbf | 1 |
| 2 | Join | 2: T3 | 1: T2 | 6: statement_fbb | 2 |
| 3 | Join | 3: T4 | 2: T3 | 7: statement_bbb | 3 |
| 4 | Join | 4: pred_0_258006_ffff | 3: T4 | 7: statement_bbb | 4 |

The five operations are ordered 0-4. The first operation is a copy operation that uses a matching pattern taken from the constraints of the query to copy data from the RDF data graph. That data is represented by the notation "statement_fbf." In this notation, "statement_xyz" represents a virtual entity that includes one or more data graphs included in the query, an intermediate table generated by one or more rules included in the query against the one or more data graphs, or any combinations thereof. In the notation, the "f" represents "free" and the "b" represents "bound." The "x" location is for the subject, the "y" location is for the predicate, and the "z" location is for the object of the RDF data. In the first operation in this example, the entity "statement_fbf" is copied to intermediate table, T1. This operation copies all data with a predicate "lastname" from the RDF data graph into table T1 (having columns ?e and ?l). The second operation joins the intermediate table T1 with entity "statement_bbf" into intermediate table T2. This operation joins T1 with "statement_bbf" (representing the RDF data graph) to find first names of all employees (?e) in T1. The results go into T2 (having columns ?e, ?l, and ?f). The third operation joins the intermediate table T2 with entity "statement_fbb" into intermediate table T3. This operation joins T2 with "statement_fbb" (representing the RDF data graph) to find all companies of all employees in T2. The results go into T3 (having columns ?e, ?l, ?f, ?c). The fourth operation joins intermediate table T3 with entity "statement_bbb" into intermediate table T4. This operation joins T3 with "statement_bbb" (representing the RDF data graph) to verify that all ?c's are of type company. The resulting T4 has columns ?e, ?l, ?f, ?c). The fifth operation joins intermediate table T4 with entity "statement_bbb" into a result table "pred_0_258006." This operation with "statement_bbb" (representing the RDF data graph) to verify that all ?e's are of type employee. The resulting T5 has columns ?e, ?l, ?f, ?c).

Tables, including intermediate tables, may be stored in one or memory elements of one or more computers associated with the data being queried. Example memory elements are discussed below with respect to exemplary computer of FIG. 8. An example of a system where the data and query-related tables may be distributed across processing resources and one or more memory elements of one or more computers is discussed below with respect to FIG. 8. In one example, a table is stored in a storage memory. In another example, a table is virtualized such that it appears to be a single stored table even if it is physically stored on multiple memory elements (e.g., that may be distributed across processing resources). Tables may be in a variety of forms. In one example, a table is in the form of a tuple.

A query may include rules that provide additional information for generating and executing operations. In one example, one or more rules may include instructions for extracting data from one or more data graphs that are the target of the query and generating one or more intermediate table from that extracted data. A resulting intermediate table can be included in an operation, such as a join with a graph, another intermediate table, and/or other data. In one example notation, an intermediate table generated by a rule may be represented as a "statement" table.

Operations may include additional information that instructs the evaluation of the data based on the operation. Examples of additional information include, but are not limited to, a join key of a join operation for instructing the data to be joined from the tables, organization of operations in layers, parameters for copy operations, and any combinations thereof.

Operations can be organized into layers. Example operations that can be layered include, but are not limited to, operations that are similar, operations that evaluate against similar tables, and/or operations that output to similar intermediate tables. In one example, operations in a layer may be evaluated in parallel. In certain examples, parallel operation may reduce time required to perform the evaluation, reduce the number of joins in the overall query, decrease bandwidth issues of data transfer between nodes of a distributed system, and any combinations thereof. The example operations listing above shows the five operations organized into five layers 0-4.

At step 220, the query is evaluated against the data. Those of ordinary skill will recognize a variety of ways to evaluate operations against data depending on the format of the data system, the query format, and/or the given operation. In one embodiment, an operation against partitioned data is evaluated such that the operation is conducted (e.g., crosswise and/or pairwise) against the target data (e.g., intermediate tables and/or graphs) to produce two or more result partitions for each of the target data partition comparisons. In one example join operation, the partitions of two tables are joined in a crosswise fashion. A crosswise join for a table having X number of partitions with a table having N number of partitions will produce X*N comparisons. Result partitions that correspond to each other across the combinations are combined into a number of intermediate tables. In one example, the number of intermediate tables matches the number of result partitions generated for each data partition comparison. An example of such an evaluation is discussed below with respect to FIG. 3.

Example operations for evaluation of data include, but are not limited to, a function operation, a copy operation, a join operation, and any combinations thereof. In one example, a copy operation copies one or more rows of data from an intermediate table and/or a data graph based on one or more matching patterns (e.g., provided in additional information of the operation. In another example, a join operation combines select data from two intermediate tables. In another example, a join operation combines select data from an intermediate table and a data graph. In yet another example, a join operation combines select data from two graphs. In still another example, a function operation executes one or more functions against one or more parameters of a table and/or a graph.

At step 225, the results of the query evaluation are output. Example outputs are discussed below with respect to FIG. 8.

Figure 3:
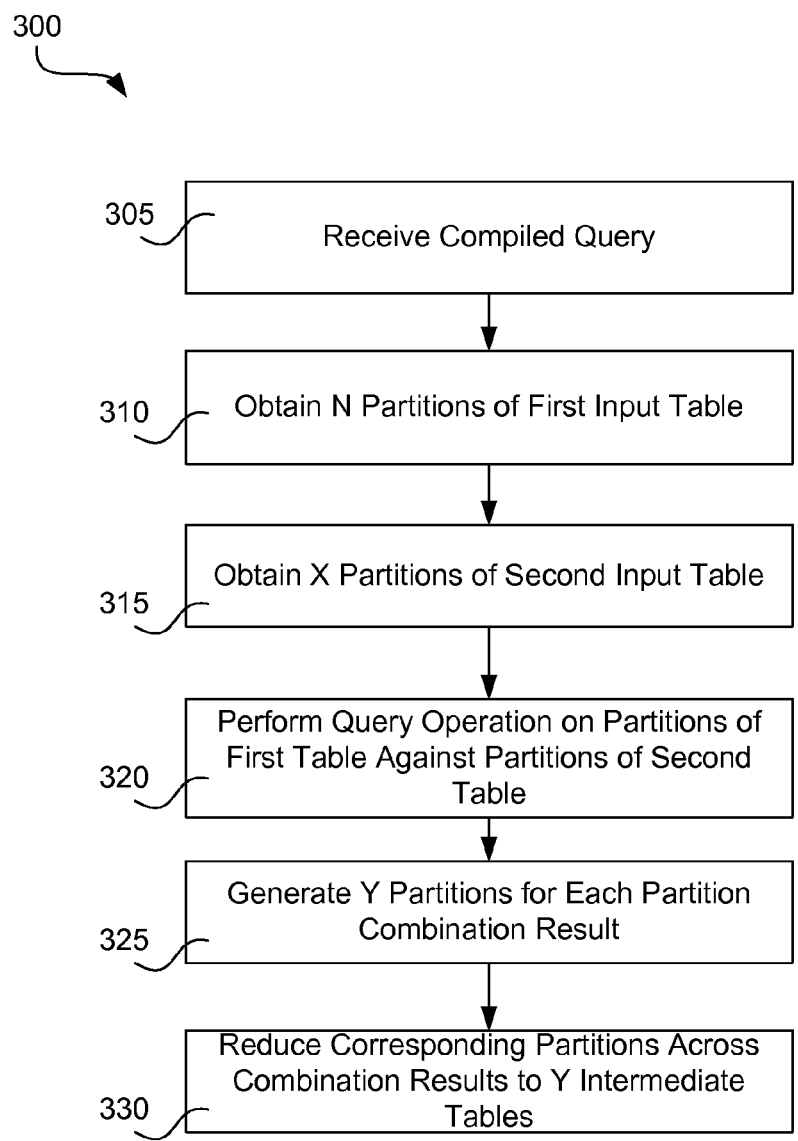
FIG. 3 illustrates an exemplary implementation of a method of evaluating a query.

FIG. 3 illustrates one exemplary implementation of a method 300 of evaluating a query. At step 305, a compiled query is received. As discussed above, a compiled query can include one or more operations, each of which may operate on one or more tables and/or graphs. In the example of method 300, the operation includes a join operation against two tables. It is noted that the aspects and characteristics of evaluating a query discussed with respect to method 300 will be understood to apply to other operations, such as pairwise joins, crosswise joins, copies, and other operations performed on a one or more tables/graphs.

At step 310, a first table/graph that is partitioned into N number of partitions is obtained. In one example the first table/graph is the data graph that is the target of the query. In another example, the first table/graph is an intermediate table generated by a rule of the query. In yet another example, the first table/graph is an intermediate table generated by a previous operation in the query being evaluated against the data. In still another example, the first table/graph is a set of input data from a source different than the target data graph.

The first table/graph may be received without being partitioned to N number of partitions. In such an example, the first table/graph can be partitioned to N partitions (e.g., as part of step 310).

At step 315, a second table/graph that is partitioned into X number of partitions is obtained. In one example the second table/graph is the data graph that is the target of the query. In another example, the second table/graph is an intermediate table generated by a rule of the query. In yet another example, the second table/graph is an intermediate table generated by a previous operation in the query being evaluated against the data. In still another example, the second table/graph is a set of input data from a source different than the target data graph.

The first table/graph may be received without being partitioned to X number of partitions. In such an example, the first table/graph can be partitioned to X partitions (e.g., as part of step 315).

At step 320, the query operation is performed of the partitions of the first table/graph against the partitions of the second table/graph. In one example, the partitions of a first table/graph are joined crosswise with the partitions of a second table/graph. In one example of a crosswise operation with the first table/graph having N partitions and the second table/graph having X partitions, the number of partition combinations equals N*X. For example, an intermediate table having N=2 partitions (N1 and N2) and a graph having X=3 partitions (X1, X2, and X3) will have the following 6 partition combinations: N1X1, N1X2, N1X3, N2X1, N2X2, N2X3. In another example, the partitions of a first table/graph are joined pairwise with the partitions of a second table/graph. In one such example, the number of partitions in the first table/graph is the same as the number of partitions in the second table/graph, and the join key includes the partition key of the table/graph, the tables can be pairwise joined. In one such example, an intermediate table having N=2 partitions (N1 and N2) and a graph having X=2 partitions (X1 and X2) where the graph is partitioned on RDF subject and the join key for the operation includes RDF subject, the partition combination are N1X1 and N2X2 (e.g., matching the corresponding partitioned partition of one table/graph with that of the other). A join key may be the columns that two table/graphs being joined have in common. In one such example joining a first table having columns (x, y, z) with a second table having columns (x, a, y), the join key would be x and y. If the partition key is included in the join key (e.g., in this example if "x" were the partition key of each table), the two tables can be pairwise joined.

At step 325, a Y number of partitions for the results of the operation on each partition combination from step 320 are generated. The value of Y can be determined by a variety of factors, including, but not limited to, the size of the data graph being evaluated against, the distribution topology of the processing resources utilized to evaluate the query, the number of operations in the query, knowledge of needed intermediate tables throughout the query operations, and any combinations thereof. In one example, the value of Y includes a determination of the number of intermediate tables utilized in the evaluation process. Other exemplary aspects of determining the number of Y and considerations for how to partition are discussed below. Following the example from above where N=2 and X=3, a Y=2 number of partitions of the result for each of partition combinations N1X1, N1X2, N1X3, N2X1, N2X2, N2X3. For example, the result of joining partition N1 with X1 (combination N1X1) could be represented as the two result partitions N1X1_1 and N1X1_2. Followed through, a total of 12 result partitions would be created using the same partitioning scheme for each result: N1X1_1, N1X1_2, N1X2_1, N1X2_2, N1X3_a, N1X3_2, N2X1_1, N2X1_2, N2X2_1, N2X2_2, N2X3_1, N2X3_2 (where partitions notated as xxxx_1 from each combination correspond to each other in the partition scheme and partitions notated as xxxx_2 from each combination correspond to each other in the partition scheme.

At step 330, the corresponding result partitions across the combinations are reduced to Y number of intermediate tables. Following the recent example, result partitions N1X1_1, N1X2_1, N1X3_1, N2X1_1, N2X2_1, N2X3_1 are reduced to an intermediate table partition (e.g., T_1) and result partitions N1X1_2, N1X2_2, N1X3_2, N2X1_2, N2X2_2, N2X3_2 are reduced to an intermediate table partition (e.g., T_2). The intermediate tables may be utilized, for example, in a later operation of the query, to produce the results of the query, and any combinations thereof.

In a query having layers, multiple operations in a layer may be configured to generate data into the same intermediate table partitions. In such an example, the related operations of a layer may each be evaluated to the result partitions for each operation (e.g., through step 320). The result corresponding result partitions for the multiple operations in the layer may then be reduced (e.g., as in step 330). It is noted that one or more of the operations in a layer may be configured to output to one or more different intermediate tables.

Any number of partitions may be utilized in an evaluation result partitioning scheme. In one example, the number of partitions for the results of an operation on each partition combination is the same as the number of partitions in the data graph that is the target of the query. In another example, the number of partitions for the results of an operation on each partition combination is the different than the number of partitions in the data graph that is the target of the query. Example factors to consider in selecting a number of partitions for an evaluation result partitioning scheme include, but are not limited to, statistics of the data in the data graph, consideration of processing resources available to which the partitioned results can be distributed; minimizing joins (e.g., by matching the number of intermediate table partitions to the number of partitions of tables/graphs that will be joined in the operations to allow possibility of pairwise comparison), and any combinations thereof.

Figure 4:
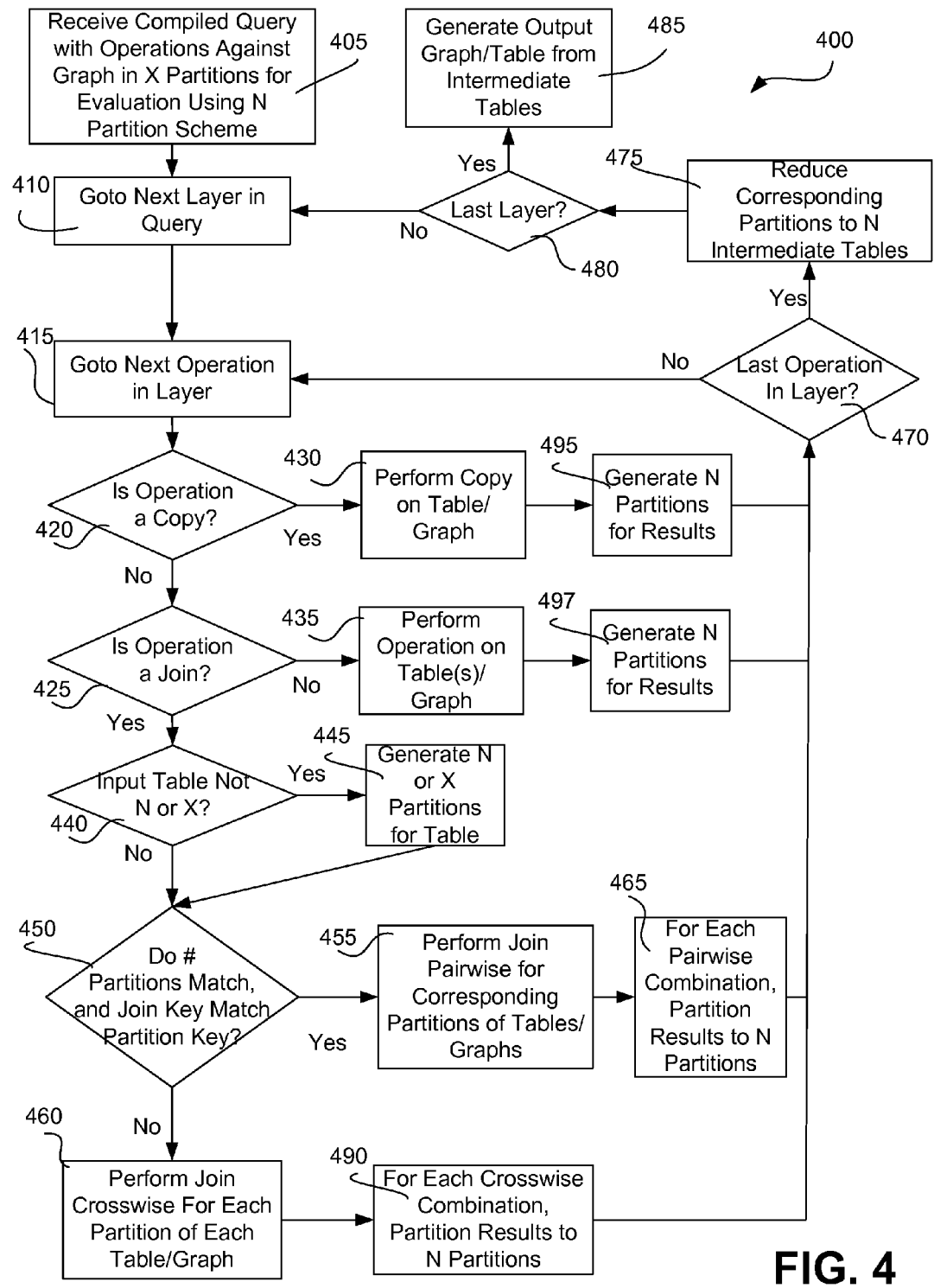
FIG. 4 illustrates another exemplary implementation of a method of query evaluation.

FIG. 4 illustrates another example implementation of a method 400 of query evaluation. Aspects of method 400 are similar to those of method 300, except as indicated. At step 405, a compiled query is received having operations for evaluation against a graph having X partitions. The partitioning scheme in the implementation utilizes N number of partitions for intermediate tables.

At step 410, the next layer in the compiled query is considered. In one example, the next layer is the first layer in the compiled query to be evaluated. In another example, the next layer is a subsequent layer in the compiled query (e.g., depending on which layers in the query order before it have been completed).

At step 415, the next operation in the current layer is considered. In one example, the next operation is the first operation in the layer. In another example, the next operation is the only operation in the layer. In yet another example, the next operation is a subsequent operation in the current layer (e.g., depending on which operations in the layer order before it have been completed).

At steps 420 and 425, a determination is made as to whether the operation is a copy operation, a join operation, or another type of operation. These steps (and steps related thereto) could alternatively be performed in a different order. At step 420, a determination is made if the operation is a copy operation. If the operation is a copy operation, the method proceeds to step 430. If the operation is not a copy operation, the method proceeds to step 435. At step 425, a determination is made if the operation is a join operation. If the operation is not a join operation, the method proceeds to step 435. If the operation is a join operation, the method proceeds to step 440.

At optional step 440, it is determined if one of the tables/graphs to be joined requires being partitioned to N or X number of partitions. In one example, a benefit may be had by having a table (e.g., of data generated outside of the target data graph) have the same number of partitions as the data graph (X) or another intermediate table (N) to which it is to be joined. Such a benefit may come from being able to perform a pairwise join of the tables/graphs. Partitioning to allow pairwise joins and/or repartitioning to allow pairwise joins can be performed at any time prior to the needed join in the order of operations. In one example, the compilation process of the query can include generation of a query operation that generates the desired partitioning of the input table/graph by partitioning the results of the operation as discussed above (e.g., with respect to step 325 of FIG. 3). If partitioning/repartitioning of a table/graph is desired at optional step 440, the method proceeds to step 445. At step 445, the table/graph is partitioned/repartitioned. If there is no need to partition/repartition at step 440, after the completion of step 445, or if step 440 is omitted, the method proceeds to step 450.

At step 450, a determination is made if the number of partitions of the tables/graphs to be joined match and if the join key of the operation includes the partition key of the tables/graphs. If these criteria are true, pairwise joining is possible at step 455. If one or more of the criteria are false, a crosswise join is performed at step 460.

At step 455, a pairwise join of corresponding partitions of the tables/graphs is performed. At step 465, an N number of result partitions are generated for each pairwise combination result. At step 470, it is determined if the current operation is the last operation in the layer. If the current operation is the last operation in the layer, the method proceeds to step 475. If the current operation is not the last operation in the layer, the method proceeds to step 415 and the next operation in the layer is considered.

At step 475, corresponding result partitions across the combinations are reduced to N number of intermediate table partitions. It is noted, as discussed above, in some examples, not all of the operations of a layer will have results in the same intermediate tables. In one example at step 475, more than one set of intermediate table partitions are generated. In another example, intermediate table partitions for results of related operations of a layer may be reduced while other unrelated operations of the layer are evaluating.

At step 480, if the current layer is the last layer of the query, the method proceeds to step 485. If the current layer is not the last layer of the query, the method proceeds to step 410 and the next layer is considered.

At step 460, a crosswise join of the partitions of the tables/graphs being considered in the operation is performed. At step 490, an N number of result partitions are generated for each crosswise combination result. At step 470, it is determined if the current operation is the last operation in the layer. If the current operation is the last operation in the layer, the method proceeds to step 475. If the current operation is not the last operation in the layer, the method proceeds to step 415 and the next operation in the layer is considered. At step 475, corresponding result partitions across the combinations are reduced to N number of intermediate table partitions. It is noted, as discussed above, in some examples, not all of the operations of a layer will have results in the same intermediate tables. In one example at step 475, more than one set of intermediate table partitions are generated. In another example, intermediate table partitions for results of related operations of a layer may be reduced while other unrelated operations of the layer are evaluating. At step 480, if the current layer is the last layer of the query, the method proceeds to step 485. If the current layer is not the last layer of the query, the method proceeds to step 410 and the next layer is considered.

At step 430, a copy operation is performed against the current tables/graphs being considered in the operation. At step 495, an N number of result partitions are generated for the results of the copy operation. At step 470, it is determined if the current operation is the last operation in the layer. If the current operation is the last operation in the layer, the method proceeds to step 475. If the current operation is not the last operation in the layer, the method proceeds to step 415 and the next operation in the layer is considered. At step 475, corresponding result partitions across the combinations are reduced to N number of intermediate table partitions. It is noted, as discussed above, in some examples, not all of the operations of a layer will have results in the same intermediate tables. In one example at step 475, more than one set of intermediate table partitions are generated. In another example, intermediate table partitions for results of related operations of a layer may be reduced while other unrelated operations of the layer are evaluating. At step 480, if the current layer is the last layer of the query, the method proceeds to step 485. If the current layer is not the last layer of the query, the method proceeds to step 410 and the next layer is considered.

At step 435, the other operation is performed against the current tables/graphs being considered in the operation. At step 497, an N number of result partitions are generated for the results of the operation. At step 495, an N number of result partitions are generated for the results of the copy operation. At step 470, it is determined if the current operation is the last operation in the layer. If the current operation is the last operation in the layer, the method proceeds to step 475. If the current operation is not the last operation in the layer, the method proceeds to step 415 and the next operation in the layer is considered. At step 475, corresponding result partitions across the combinations are reduced to N number of intermediate table partitions. It is noted, as discussed above, in some examples, not all of the operations of a layer will have results in the same intermediate tables. In one example at step 475, more than one set of intermediate table partitions are generated. In another example, intermediate table partitions for results of related operations of a layer may be reduced while other unrelated operations of the layer are evaluating. At step 480, if the current layer is the last layer of the query, the method proceeds to step 485. If the current layer is not the last layer of the query, the method proceeds to step 410 and the next layer is considered.

Figure 5:
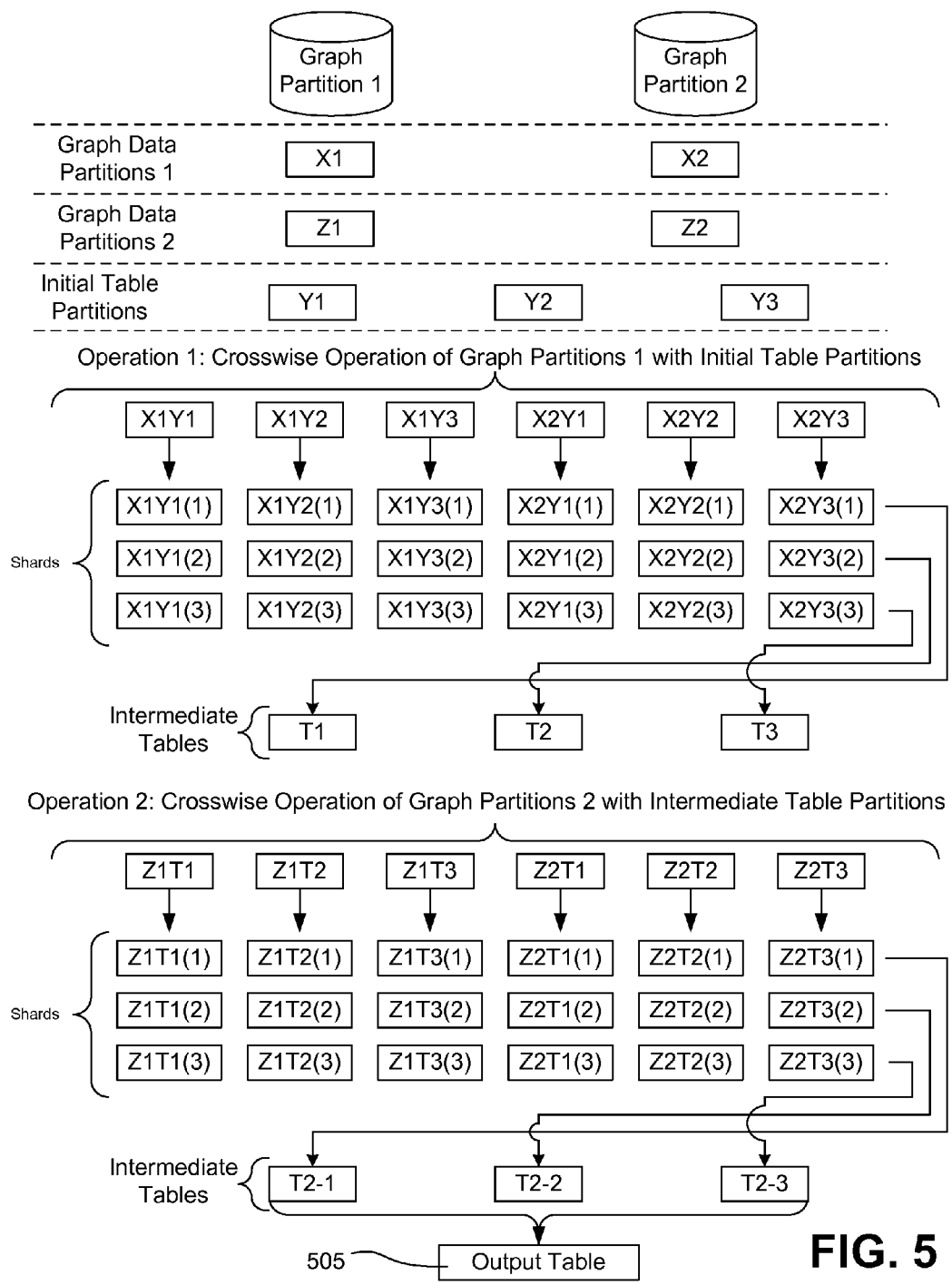
FIG. 5 illustrates a graphical representation of an exemplary implementation of a query evaluation method.

FIG. 5 is a graphical representation of an exemplary implementation of a query evaluation method, such as method 300 and method 400. In this example, a query having two operations: operation 1 including a crosswise join of graph data partitions 1 (X1 and X2) with initial table partitions (Y1, Y2, and Y3) and operation 2 including a crosswise join of graph data partitions (Z1 and Z2) with intermediate result tables from the result of the first operation (T1, T2, and T3). In this example, the number of result partitions for the results of each partition combination is the same as the number of partitions of the intermediate tables in the partitioning scheme for the query evaluation. This number differs from the number of partitions of the target data graph, which has two partitions: graph partition 1 and graph partition 2. Graph data partitions X1 and Z1 correspond to graph partition 1. Graph data partitions X2 and Z2 correspond to graph partition 2.

Performance of operation 1 includes six crosswise partition comparisons: X1Y1, X1Y2, X1Y3, X2Y1, X2Y2, X2Y3. The notation of the comparisons has the first partition being joined (e.g., "X1") followed by the second partition being joined (e.g., "Y1"). For each of the comparisons, the results are partitioned into three result partitions. The result partitions for each combination follow the notation of x#y#(1), x#y#(2), and x#y#(3), where each of the result partitions with a (1) at the end of the notation correspond across combination results, each of the result partitions with a (2) at the end of the notation correspond across combination results, and each of the result partitions with a (3) at the end of the notation correspond across combination results. In this example, 18 result partitions (also referred to as "shards") are generated from the operation 1. The six corresponding partitions of result partitioning (1) [i.e., X1Y1(1), X1Y2(1), X1Y3(1), X2Y2(1), and X2Y3(1)] are reduced to intermediate table T1. The six corresponding partitions of result partitioning (2) [i.e., X1Y1(2), X1Y2(2), X1Y3(2), X2Y1(2)] are reduced to intermediate table T2. The six corresponding partitions of result partitioning (3) [i.e., X1Y1(3), X1Y2(3), X1Y3(3), X2Y1(3), X2Y2(3), and X2Y3(3)] are reduced to intermediate table T3.

Performance of operation 2 includes six crosswise partition comparisons: Z1T1, Z1T2, Z1T3, Z2T1, Z2T2, Z2T3. For each of the comparisons, the results are partitioned into three result partitions for a total of 18 results partitions. The six corresponding partitions of result partitioning (1) [i.e., Z1T1(1), Z1T2(1), Z1T3(1), Z2T1(1), Z2T2(1), and Z2T3(1)] are reduced to intermediate table T2-1. The six corresponding partitions of result partitioning (2) [i.e., Z1T1(2), Z1T2(2), Z1T3(2), Z2T1(2), Z2T2(2), and Z2T3(2)] are reduced to intermediate table T2-2. The six corresponding partitions of result partitioning (3) [i.e., Z1T1(3), Z1T2(3), Z1T3(3), Z2T1(3), Z2T2(3), and Z2T3(3)] are reduced to intermediate table T2-3.

In an alternative implementation where intermediate tables T1, T2, T3 include a parameter (e.g., data column) that is the same as the partition key of the data graph and the join key of operation 2, intermediate tables T1, T2, and T3 could be repartitioned to the same number of partitions as the graph using the same partitioning key. In such an example, a pairwise comparison of graph data 2 and the results of operation 1 could be performed.

Referring again to the implementation in FIG. 5, intermediate tables T2-1, T2-2, and T2-3 are reduced to output table 505.

Figure 6:
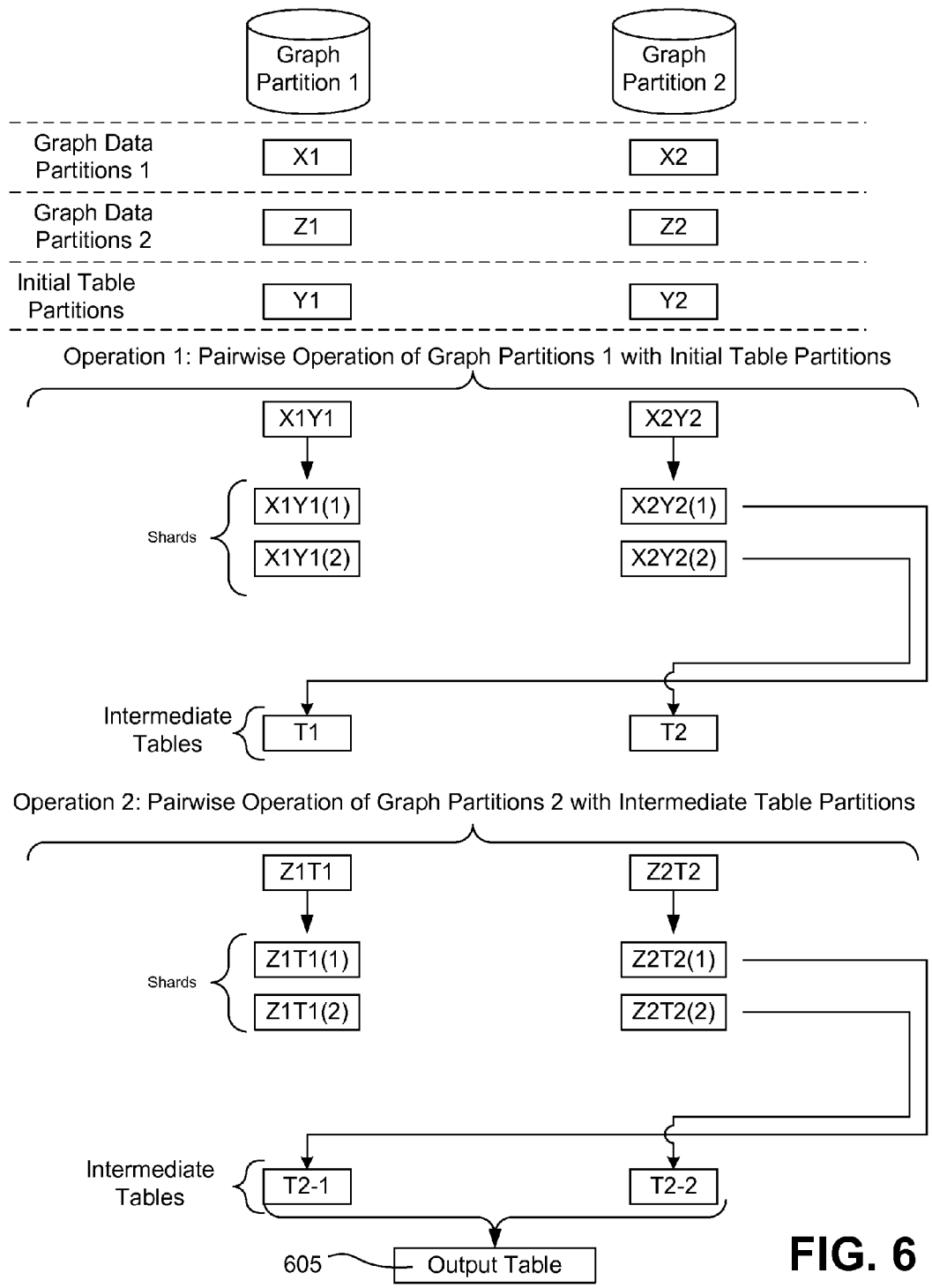
FIG. 6 illustrates another graphical representation of another exemplary implementation of a query evaluation method.

FIG. 6 is another graphical representation of another exemplary implementation of a query evaluation method, such as methods 300 and 400.

In this example, a query having two operations: operation 1 including a pairwis join of graph data partitions 1 (X1 and X2) with initial table partitions (Y1 and Y2) and operation 2 including a crosswise join of graph data partitions (Z1 and Z2) with intermediate result tables from the result of the first operation (T1 and T2). In this example, the number of result partitions for the results of each partition combination is the same as the number of partitions of the intermediate tables in the partitioning scheme for the query evaluation. This number of partitions of the data graph and the partitioning scheme of the input tables and intermediate tables is also the same. In this example, the number of partitions of the tables/graphs being joined in each operation is the same and the join key for each operation includes the partition key of each table/graph. Graph data partitions X1 and Z1 correspond to graph partition 1. Graph data partitions X2 and Z2 correspond to graph partition 2. The partitioning of graph data partition X1 corresponds to that of table partition Y1 and the partitioning of graph data partition X2 corresponds with that of table partition Y2.

Performance of operation 1 includes two pairwise partition comparisons: X1Y1 and X2Y2. The notation of the comparisons has the first partition being joined (e.g., "X1") followed by the second partition being joined (e.g., "Y1"). For each of the comparisons, the results are partitioned into two result partitions. The result partitions for each combination follow the notation of x#y#(1) and x#y#(2) where each of the result partitions with a (1) at the end of the notation correspond across combination results, and each of the result partitions with a (2) at the end of the notation correspond across combination results. In this example, 4 result partitions (also referred to as "shards") are generated from the operation 2. The two corresponding partitions of result partitioning (1)

[i.e., X1Y1(1) and X2Y2(1)] are reduced to intermediate table T1. The two corresponding partitions of result partitioning (2) [i.e., X1Y1(2) and X2Y2(2)] are reduced to intermediate table T2.

Performance of operation 2 includes two pairwise partition comparisons: Z1T1 and Z2T2. For each of the comparisons, the results are partitioned into two result partitions for a total of 4 results partitions. The two corresponding partitions of result partitioning (1) [i.e., Z1T1(1) and Z2T2(1)] are reduced to intermediate table T2-1. The two corresponding partitions of result partitioning (2) [i.e., Z1T1(2) and Z2T2(2)] are reduced to intermediate table T2-2.

Intermediate tables T2-1 and T2-2 are reduced to output table 605.

The embodiments and aspects of query compilation and evaluation methods discussed above (e.g., method 200, method 300, and method 400) can be employed in a distributed computer processing environment. In such a distributed environment, the work of compiling and evaluating a query can be distributed for possible performance enhancements. There are many ways to distribute the various compilations, operations, etc. of a query to a plurality of processing resources on one or more computers.

In one embodiment, each partition combination of an operation evaluation can be assigned to a task object. A task object includes machine executable instructions for executing the assigned operation on the assigned partition of one or more tables/graphs. In one example, a task is implemented as .NET class that implements a particular interface. Tasks can be distributed to different processing resources for execution (e.g., in parallel) against the partitions of tables/graphs. Example tasks include, but are not limited to, a copy task configured to copy data rows from an intermediate table or a graph partition to another intermediate table, a function task configured to execute a function against one or more parameters of an intermediate table and generate another table, a join task configured to join two tables/graphs to an intermediate table, a reduce task configured to aggregate corresponding result partitions to an intermediate table, a partition task configured to reparation one or more tables, a model update task configured to generate a table/graph including aggregated intermediate table partitions generated by two or more tasks to the table/graph, and any combinations thereof. In one implementation, a task is configured to have the results of its work generated in a number of result partitions corresponding to the evaluation partition scheme.

Task objects may be generated by a job object. A job object includes machine executable instructions for generating one or more tasks. Example jobs include, but are not limited to a bulk parse and load of a number of data files (e.g., RDF files), a bulk inference process (e.g., run against a large data graph), a ranking of resources based on one or more criteria, and any combinations thereof. In one example, a job is implemented as a .NET class that implements a particular interface. A job can be configured to support an IRDFSerialized interface.

Returning to one of the examples from above, the following compiled query can be implemented as task objects.

In this example, the exemplary compiled query is run against a data graph in four partitions and uses an evaluation partition scheme that has intermediate tables partitioned to four partitions. The first operation (a copy operation) can be implemented as the following task objects organized in two batches:

Batch 1a:

CopyTask(g1)
CopyTask(g2)
CopyTask(g3)
CopyTask(g4)

Batch 1b:

ReduceTask(T1_1)
ReduceTask(T1_2)
ReduceTask(T1_3)
ReduceTask(T1_4)

where "CopyTask" represents a copy task object, "ReduceTask" represents a reduce task, "g1" represents that the copy task copies data from the first partition of the graph "statement_fbf" into four result partitions, "g2" represents that the copy task copies data from the second partition of the graph "statement_fbf" to four result partitions, "g3" represents that the copy task copies data from the third partition of the graph "statement_fbf" to four result partitions, "g4" represents that the copy task copies data from the fourth partition of the graph "statement_fbf" to four result partitions, "T1_1" represents that the reduce task reduces the first set of corresponding result partitions to a first partition of output intermediate table T1, "T1_2" represents that the reduce task reduces the second set of corresponding result partitions to a second partition of output intermediate table T1, "T1_3" represents that the reduce task reduces the third set of corresponding result partitions to a third partition of output intermediate table T1, and "T1_4" represents that the reduce task reduces the fourth set of corresponding result partitions to a fourth partition of output intermediate table T1.

Each of the copy task objects can be executed in parallel on different processing resources associated with the query evaluation. An example of distributed processing resources is discussed below with respect to FIG. 7. Each of the reduce task objects can be executed in parallel on different processing resources associated with the query evaluation.

The second operation (a join operation) in this example is a crosswise join of the partitions of T1 with the four partitions of the data graph (noting that the data graph is represented in the compiled query as "statement_bbf"). This operation can be implemented as two batches of task objects:

| Order | Operation | Output Intermediate Table | Input 1 | Input 2 | Layer |
|---|---|---|---|---|---|
| 0 | Copy | 0: T1 | 0: statement_fbf | | 0 |
| 1 | Join | 1: T2 | 0: T1 | 5: statement_bbf | 1 |
| 2 | Join | 2: T3 | 1: T2 | 6: statement_fbb | 2 |
| 3 | Join | 3: T4 | 2: T3 | 7: statement_bbb | 3 |
| 4 | Join | 4: pred_0_258006_ffff | 3: T4 | 7: statement_bbb | 4 |

Batch 2a:

```
JoinTask(T1_1, g1)
JoinTask(T1_1, g2)
JoinTask(T1_1, g3)
JoinTask(T1_1, g4)
JoinTask(T1_2, g1)
JoinTask(T1_2, g2)
JoinTask(T1_2, g3)
JoinTask(T1_2, g4)
JoinTask(T1_3, g1)
JoinTask(T1_3, g2)
JoinTask(T1_3, g3)
JoinTask(T1_3, g4)
JoinTask(T1_4, g1)
JoinTask(T1_4, g2)
JoinTask(T1_4, g3)
JoinTask(T1_4, g4)
```

Batch 2b:

```
ReduceTask(T2_1)
ReduceTask(T2_2)
ReduceTask(T2_3)
ReduceTask(T2_4)
``` where the notation of "JoinTask" represents a join task object and "ReduceTask" represents a reduce task object. This example operation generates 16 join task objects, one each for the crosswise join of the partitions of T1 with the four partitions of the data graph. The example operation generates 64 result partitions, four each for each join task. Each of the copy task objects is configured to generate four result partitions. ReduceTask(T2_1) is configured to reduce the first set of corresponding result partitions to a first partition of output intermediate table T2, ReduceTask(T2_2) is configured to reduce the second set of corresponding result partitions to a second partition of output intermediate table T2, ReduceTask (T2_3) is configured to reduce the third set of corresponding result partitions to a third partition of output intermediate table T2, and ReduceTask(T2_4) is configured to reduce the fourth set of corresponding result partitions to a fourth partition of output intermediate table T2.

A similar set of join task objects and reduce task objects can be generated for each of the remaining three join operations of the example compiled query. Each of the join tasks can be executed in parallel on different processing resources associated with the query evaluation.

Figure 7:
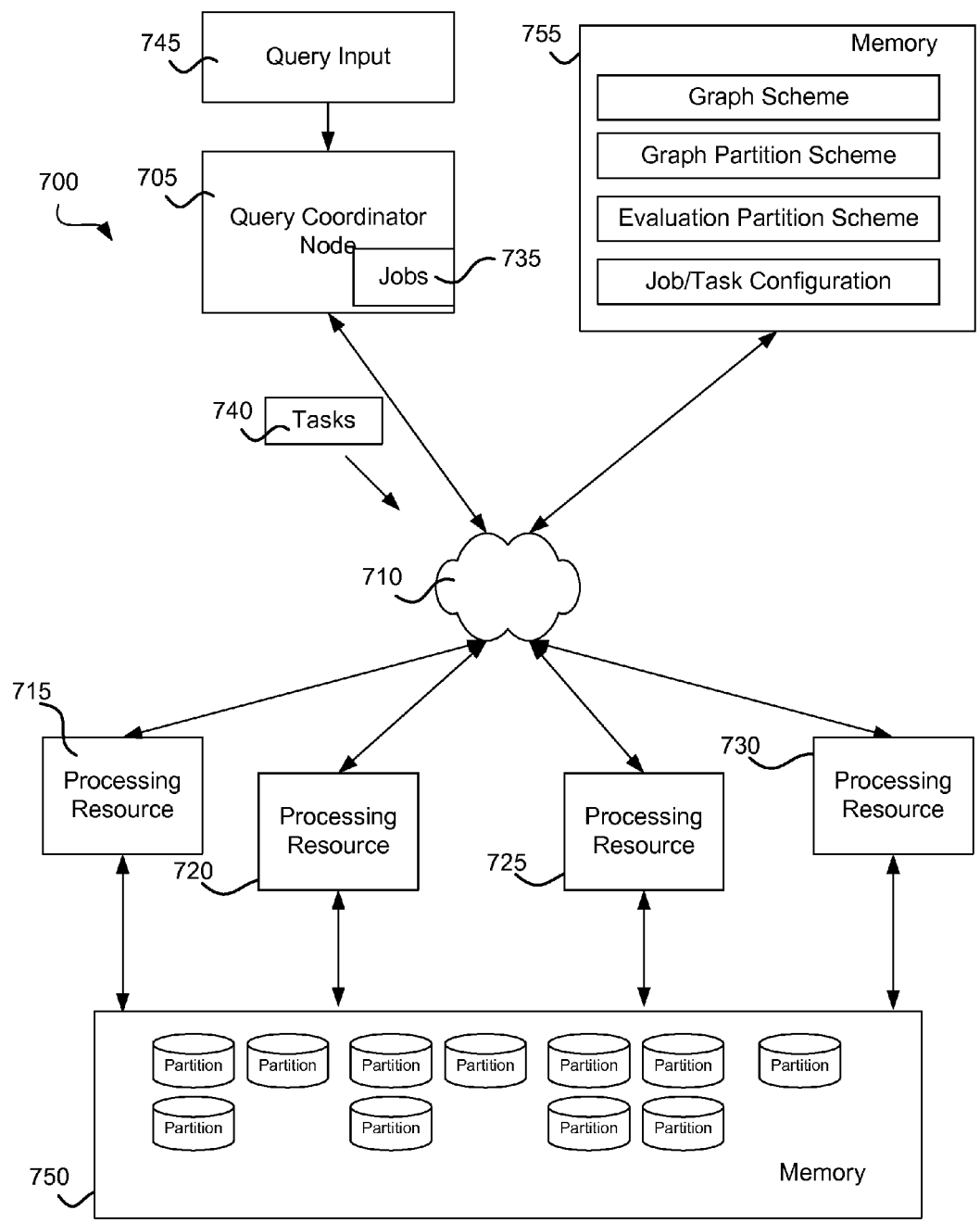
FIG. 7 illustrates a diagrammatic representation of one implementation of a computing device.

FIG. 7 illustrates one exemplary implementation of a distributed query compilation and evaluation environment 700. Environment 700 includes a query coordinator node 705 connected via a connection 710 to a processing resource node 715, a processing resource node 720, a processing resource node 725, and a processing resource node 730. Connection 710 may be any connection capable of connecting the elements of the environment. Example connections include, but are not limited to, a network connection, a direct internal wired connection of a computer, a server backbone connection, other wired connection, other wireless connection, and any combinations thereof. Example networks are discussed below with respect to FIG. 8.

Each of processing resource nodes 710, 715, 720, and 725 include a processing element configured to handle one or more tasks. Each processing resource node may also be configured to execute other instructions including, but not limited to, being configured to request information from query coordinator 705 to determine which partitions the processing resource node will host, communicate to query coordinator 705 a signal that the processing resource node is operating, communicate to query coordinator 705 information that a task that the processing resource node was running has completed, communicate to query coordinator 705 results of a task object, abort a task running, execute a task, reassign its processing resources to a different data partition, add and/or remove partitions/graphs, and any combinations thereof. Query coordinator node 705 may be configured to execute other instruction including, but not limited to, being configured to receive a job from another computing element of the environment (e.g., from a client, from another element of a query engine, from a compiler element), manage the scheme of the one or more graphs of the environment, add and/or remove an instance of a graph, distribute tasks to processing resource nodes, instruct a processing resource node to change partitions being hosted, manage data sets, manage graphs, manage partitions, manage jobs, execute a model update task, assign jobs and/or tasks down the hierarchy of the distributed environment (e.g., to have an entire job execute on one or more lower processing resources), receive results of a task, aggregate results of related tasks, and any combinations thereof.

Environment 700 shows job objects 735 resident in query coordinator node 705 and task objects being communicated via connection 710 to one or more of processing resources 715, 720, 725, 730. A query input 745 may be connected to query coordinator node 705. Query input 745 may communicate a query to query coordinator node 705. In one such example, query coordinator node 705 may be configured to include abilities to compile the received query and generate jobs and/or tasks for the operations of the compiled query. Query input 745 may communicate a compiled query (e.g., a query compiled by another component of a query engine) to query coordinator node 705. In one such example, query coordinator node 705 may be configured to include abilities to generate jobs and/or tasks for the operations of the compiled query. Query input 745 may communicate jobs and/or tasks (e.g., jobs and/or tasks generated by another component of a query engine) to query coordinator node 705.

Environment 700 includes a memory 750. Memory 750 includes data of partitions being queried. Memory 750 is shown as a shared memory in communication with processing resource nodes 715, 720, 725, 730. It is contemplated that memory 750 may include any number of one or more memory elements physically located on any number of computer devices (e.g., servers). When memory 750 is distributed over multiple physical memory elements, the partitions may be virtually managed (e.g., by query coordinator node 705 or another component of a query engine) to appear to processing resource nodes and query coordinator node 705 to be a single data repository (e.g., available to be accessed by each of processing resource nodes 715, 720, 725, 730 regardless of whether the memory element is physically located in the same computing device as the processing resource node). Processing Resource Nodes 715, 720, 725, 730 are shown as separate elements. It is contemplated that each of processing resource nodes 715, 720, 725, 730 may be associated with any number of one or more computer devices. In one example, environment 700 includes one computer device having all of the processing resource nodes and has memory 750 associated therewith. In another example, environment 700 includes multiple computer devices. In one such example, query coordinator node 705, processing resource node 715, processing resource node 720, processing resource node 725, processing resource node 730, memory 750, and a memory 755 may each be associated in any combination on one or more of the multiple computer devices. Memory 755 is shown to include information related to the graph scheme of the organization of one or more graphs in environment 700, the graph partition scheme, the evaluation partition scheme, and the job/task configuration. Memory 755 may include one or more memory element on one or more computer devices. One or more of the memory elements of memory 755 may be shared with one or more memory elements of memory 750.

It is to be noted that the aspects and embodiments described herein may be conveniently implemented using one or more machines (e.g., one or more computing devices that are part of a query compiling and/or evaluation system) including hardware and special programming according to the teachings of the present specification, as will be apparent to those of ordinary skill in the computer art. Appropriate software coding can readily be prepared by skilled programmers based on the teachings of the present disclosure, as will be apparent to those of ordinary skill in the software art.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a computer workstation, a terminal computer, a server computer, a handheld device (e.g., tablet computer, a personal digital assistant "PDA", a mobile telephone, etc.), a web appliance, a network router, a network switch, a network bridge, any machine capable of executing a sequence of instructions that specify an action to be taken by that machine, and any combinations thereof. In one example, a computing device may include and/or be included in, a kiosk.

Figure 8:
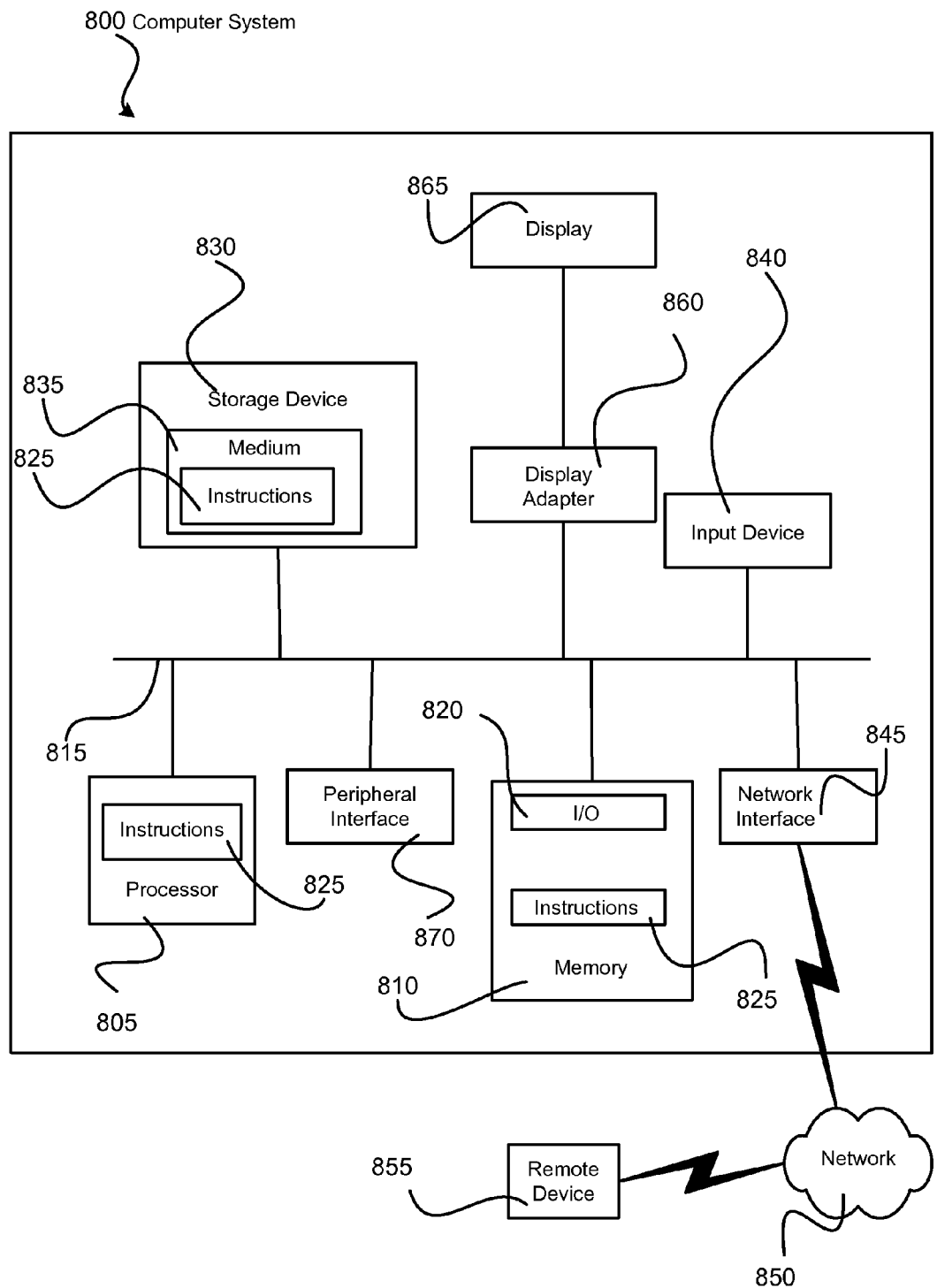
FIG. 8 illustrates an exemplary computing environment.

FIG. 8 shows a diagrammatic representation of one embodiment of a computing device in the exemplary form of a computer system 800 within which a set of instructions for causing the device to perform any one or more of the aspects and/or methodologies of the present disclosure may be executed. It is also contemplated that multiple computing devices may be utilized to implement a specially configured set of instructions for causing the device to perform any one or more of the aspects and/or methodologies of the present disclosure. Computer system 800 includes a processor 805 and a memory 810 that communicate with each other, and with other components, via a bus 815. Processor 805 may include any number of processing cores. A processing resource may include any number of processors and/or processing cores to provide a processing ability to one or more of the aspects and/or methodologies described herein. Bus 815 may include any of several types of bus structures including, but not limited to, a memory bus, a memory controller, a peripheral bus, a local bus, and any combinations thereof, using any of a variety of bus architectures.

Computer 800 may include any number of memory elements, such as memory 810 and/or storage device 830 discussed below.

Memory 810 may include various components (e.g., machine readable media) including, but not limited to, a random access memory component (e.g, a static RAM "SRAM", a dynamic RAM "DRAM", etc.), a read only component, and any combinations thereof. In one example, a basic input/output system 820 (BIOS), including basic routines that help to transfer information between elements within computer system 800, such as during start-up, may be stored in memory 810. Memory 810 may also include (e.g., stored on one or more machine-readable media) instructions (e.g., software) 825 embodying any one or more of the aspects and/or methodologies of the present disclosure. In another example, memory 810 may further include any number of program modules including, but not limited to, an operating system, one or more application programs, other program modules, program data, and any combinations thereof.

Computer system 800 may also include a storage device 830. Examples of a storage device (e.g, storage device 830) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 830 may be connected to bus 815 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 830 may be removably interfaced with computer system 800 (e.g., via an external port connector (not shown)). Particularly, storage device 830 and an associated machine-readable medium 835 may provide nonvolatile and/or volatile storage of machine-readable instructions, data structures, program modules, and/or other data for computer system 800. In one example, software 825 may reside, completely or partially, within machine-readable medium 835. In another example, software 825 may reside, completely or partially, within processor 805.

Computer system 800 may also include an input device 840. In one example, a user of computer system 800 may enter commands and/or other information into computer system 800 via input device 840. Examples of an input device 840 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 840 may be interfaced to bus 815 via any of a variety of interfaces (not shown) including, but not limited to, a serial interface, a parallel interface, a game port, a USB interface, a FIREWIRE interface, a direct interface to bus 815, and any combinations thereof.

A user may also input commands and/or other information to computer system 800 via storage device 830 (e.g., a removable disk drive, a flash drive, etc.) and/or a network interface device 845. A network interface device, such as network interface device 845 may be utilized for connecting computer system 800 to one or more of a variety of networks, such as network 850, and one or more remote devices 855 connected thereto. Examples of a network interface device include, but are not limited to, a network interface card, a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a direct connection between two computing devices, a direct connection between components of a system and/or computing device, and any combinations thereof. A network, such as network 850, may employ a wired and/or a wireless mode of communication. In general, any network topology may be used. Information (e.g., data, software 825, etc.) may be communicated to and/or from computer system 800 via network interface device 845.

Computer system 800 may further include a video display adapter 860 for communicating a displayable image to a display device, such as display device 865. Examples of a display device include, but are not limited to, a liquid crystal display (LCD), a cathode ray tube (CRT), a plasma display, and any combinations thereof. In addition to a display device, a network interface, and memory elements, a computer system 800 may include one or more other peripheral output devices including, but not limited to, an audio speaker, a printer, and any combinations thereof. Such peripheral output devices may be connected to bus 815 via a peripheral interface 870. Examples of a peripheral interface include, but are not limited to, a serial port, a USB connection, a FIREWIRE connection, a parallel connection, and any combinations thereof. Query results as described herein may be presented via any of the output capable elements of computer 800 including, but not limited to, video display adapter 860 and/or one or more other peripheral output devices.

In an alternate implementation, a query evaluation method (e.g., method 300, method 400) may include a cyclical evaluation of one or more operations and/or layers of operations where one or more operations and/or layers are repeated in a cyclical fashion. In another alternate implementation, a compilation process may include the generation of tasks and/or jobs for implementation of operations of a query. In yet another alternate implementation, a distributed environment may include multiple layers of distribution. In still another alternate implementation, a query may be partially delegated to a lower level of a distributed environment.

In one exemplary aspect of the implementations and embodiments described herein, a large data graph may be distributed over many processing resources and queries evaluated across the distributed graph in parallel (e.g., to possibly generate efficiencies that may allow graphs that could not previously be evaluated for inferential queries to be evaluated). In another exemplary aspect of the implementations and embodiments described herein, multiple operations/tasks may be distributed down to a processing resource hosting a partition (e.g., possibly taking advantage of doing pattern joins on RDF statement handle values that are known at the partition level, without resolving the handles to values). In still another exemplary aspect of the implementations and embodiments described herein, repartitioning intermediate tables (and/or graphs) may allow pairwise joins which may reduce the number of total combinations. In yet another exemplary aspect of the implementation and embodiments described herein, a task related to a join operation that will produce no change in an intermediate table can be not generated (e.g., possibly saving resource time and creating efficiency). Other aspects and benefits of the above described embodiments and implementations will be understood by those of ordinary skill from the disclosure herein.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed:

1. A computer implemented method of evaluating a query including one or more query operations, the method comprising:
   obtaining a compiled query including a join operation against a first table, the first table having a first set of partitions, the first set including an X number of partitions, the query including a partitioning scheme for intermediate tables that includes an N number of partitions;
   obtaining a second set of partitions of a second table, the second set including a Y number of partitions;
   performing using a query engine the join operation of one or more partitions of the first set against one or more of the partitions of the second set to create a plurality of combination results, wherein if the join operation is a pairwise join, each of the partitions of the first set are joined against corresponding ones of the partitions of the second set such that each join creates a combination result, the number of combination results in the plurality of combination results for the pairwise join being the same as X and Y, wherein if the join operation is a crosswise join, each of the partitions of the first set is joined against each of the partitions of the second set such that each join creates a combination result, the number of combination results in the plurality of combination results for the crosswise join is X*Y;
   partitioning each of the plurality of combination results to produce a result set of result partitions for each of the plurality of combination results, each result set including N partitions; and
   reducing corresponding ones of the result partitions across the result sets to an intermediate table to produce a set of N intermediate tables, each intermediate table including data from a result partition from each of the result sets.

2. A method according to claim 1, wherein Y does not equal N at the time of said obtaining a second set of partitions.

3. A method according to claim 2, further comprising repartitioning the second set to have N number of partitions prior to said performing the join operation such that Y is the same as N.

4. A method according to claim 1, wherein Y does not equal X at the time of said obtaining a second set of partitions.

5. A method according to claim 4, further comprising repartitioning the second set to have X number of partitions prior to said performing the join operation such that Y is the same as X.

6. A machine readable hardware storage medium containing machine executable instructions for implementing a method of evaluating a query including one or more query operations, the instructions comprising:

a set of instructions for obtaining a compiled query including a join operation against a first table, the first table having a first set of partitions, the first set including an X number of partitions, the query including a partitioning scheme for intermediate tables that includes an N number of partitions;

a set of instructions for obtaining a second set of partitions of a second table, the second set including a Y number of partitions;

a set of instructions for performing using a query engine the join operation of one or more partitions of the first set against one or more of the partitions of the second set to create a plurality of combination results, wherein if the join operation is a pairwise join, each of the partitions of the first set are joined against corresponding ones of the partitions of the second set such that each join creates a combination result, the number of combination results in the plurality of combination results for the pairwise join being the same as X and Y, wherein if the join operation is a crosswise join, each of the partitions of the first set is joined against each of the partitions of the second set such that each join creates a combination result, the number of combination results in the plurality of combination results for the crosswise join is X*Y;

a set of instructions for partitioning each of the plurality of combination results to produce a result set of result partitions for each of the plurality of combination results, each result set including N partitions; and a set of instructions for reducing corresponding ones of the result partitions across the result sets to an intermediate table to produce a set of N intermediate tables, each intermediate table including data from a result partition from each of the result sets.

7. A machine readable hardware storage medium according to claim 6, wherein Y does not equal N at the time of said obtaining a second set of partitions.

8. A machine readable hardware storage medium according to claim 7, further comprising a set of instructions for repartitioning the second set of partitions to have N number of partitions prior to said performing the join operation such that Y is the same as N.

9. A machine readable hardware storage medium according to claim 6, wherein Y does not equal X at the time of said obtaining a second set of partitions.

10. A machine readable hardware storage medium according to claim 9, further comprising a set of instructions for repartitioning the second set of partitions to have X number of partitions prior to said performing the join operation such that Y is the same as X.

\* \* \* \* \*